Patented Mar. 1, 1932

1,847,366

UNITED STATES PATENT OFFICE

HUGH M. SPENCER, OF LOCKPORT, NEW YORK, ASSIGNOR TO THE UPSON COMPANY, OF LOCKPORT, NEW YORK, A CORPORATION OF NEW YORK

INTUMESCENT SILICATE COMPOSITIONS

No Drawing.     Application filed January 18, 1929. Serial No. 333,530.

My present invention relates to the production of porous or cellular material produced by intumescing compositions containing silicate of soda as used for building and similar products, and is an improvement upon the inventions disclosed in United States Letters Patent to Howard F. Weiss et al., No. 1,628,206, dated May 10, 1927, entitled "Molded product and process for its manufacture"; and Kemper Slidell, No. 1,655,714, dated January 10, 1928, and entitled "Machine and method for making wallboard". It has for its object to provide a new composition and method of such general nature which will be cheaper to produce in the way of reducing both the quantity and quality of the silicate of soda component of an intumescent plastic composition in which the silicate of soda is mixed with an inorganic filler. The improvements are further directed, in a composition of this kind toward making available as a filler component, materials not hitherto practicable for use in the making of a high grade commercial article such as a water and moisture resisting wallboard.

To these and other ends the invention resides in certain improvements and combinations of parts, all as will be hereinafter more fully described, the novel features being pointed out in the claims at the end of this specification.

In the inventions of the patents just mentioned, an examination of which is suggested, a method is described wherein a solution of silicate of soda is mixed in certain specified proportions, such as one-part alkali sodium silicate with about two-parts of powdered filler, which may be dolomite, limestone, slate, ashes, and the like. The intumescent plastic thus produced is passed between heated platens so that, while confined thereby, together, if preferred, with paper liners or facings, it is puffed by heat into a cellular coherent mass that becomes hardened and rendered water and moisture resistant by certain other heat treatments and drying, and constituting an excellent insulating material suitable for use as a wallboard in building, and for other purposes.

Under this process as hitherto known it is necessary to comminute the limestone used as a filler by prolonged and extensive grinding to dimensions not easily attainable in ordinary grinding mills. By the use of my present invention such extraordinary and costly grinding is obviated in the production of a commercially successful product. Further, my present invention makes available as filler material such cheap substances as common sand, ground slag, ground shale, or even common clay. Ordinarily all of the before mentioned filler substances (limestone excepted) do not produce a product sufficiently water and moisture resistant to be always commercially useful as a wallboard in buildings and for other purposes.

In carrying out my invention, I have found that by incorporating the chemical compound, well known as "light magnesium carbonate", into the mix of silicate of soda solution and the powdered inorganic filler, I can produce intumesced, porous, building materials without excessively grinding limestone and can also use comminuted materials other than limestone, e. g., sand, ground slag, ground shale, etc. and can use less concentrated silicate of soda solution than has been possible heretofore and at the same time produce a satisfactory water and moisture resistant product suitable for wallboards for buildings and for other purposes. The light magnesium carbonate that I use occurs in nature, and is also made by mixing magnesium sulfate and sodium carbonate together with suitable precautions. The light magnesium carbonate may also be made in other ways too numerous to mention. However, whether the light magnesium carbonate that I use in this invention is of natural occurrence or is artificially prepared, it is essential that it consist of a very bulky mass of minute particles and usually as a mixture of very small crystals and amorphous particles. I specifically wish to point out that the light magnesium carbonate of commerce, rather than the heavy magnesium carbonate, is suitable for the accomplishment of this invention.

An exact chemical formula for light magnesium carbonate can not be given, because its formula seems to vary to some extent, depending upon different methods by which it is produced. The substance is known and definitely recognized in the chemical trade by the name "light magnesium carbonate", however, and any substance commonly called by this name is suitable for the purposes of the present invention, notwithstanding any slight variations in its chemical formula. Light magnesium carbonate is commonly obtainable both in a pure grade, suitable for medical use, and in a technical or commercial grade. The technical, or commercial grade of light magnesium carbonate is satisfactory for the purposes of the present invention. Light magnesium carbonate is readily distinguishable from the "heavy magnesium carbonate" by the much greater bulk of the light carbonate. That is, a given weight of light magnesium carbonate occupies a material greater volume than the same weight of heavy magnesium carbonate.

In the practice of my invention I prefer, at present, to take sand, crushed slag, crushed shale, crushed limestone or other inorganic material crushed to a fineness so that 75%, more or less, of the material will pass through a 30 mesh screen. The degree of fineness of filler is very much coarser than that which it has been possible to use hitherto in the prior art, wherein over 95% of ground limestone must pass through a 200 mesh screen in order to produce a commercially water and moisture resistant building composition. Also, in the prior art the choice of a filler has been commercially restricted to limestone if a water and moisture resistant product such as wallboard is to be produced, while in the present invention such restriction is no longer effective. Taking the relatively coarser fillers above mentioned, I incorporate them with light magnesium carbonate and silicate of soda solution by means of any suitable weighing and mixing devices. For example, I may take by weight 790 parts of substantially dry sand, 10 parts of light magnesium carbonate, and 300 parts of a 48.5° Bé. silicate of soda solution and mix these materials in any suitable manner. I may then mold this mixture in any suitable device to form a building composition. For example, I may place this mix between sheets of liners composed of paper fibers to form a wallboard. I then intumesce the building composition by any suitable heating device such as by passage through steam heated platens. I next subject the intumesced material to the action of hot air in an oven. In general the temperature of the oven should approximate 410° Fahrenheit, and the intumesced building material of this invention should be subjected to this heat for sufficient time to expel substantially all of the moisture present—e. g., for 20 minutes, more or less. This heating operation as described in the United States patents aforesaid is particularly important in securing a commercially water and moisture resistant building composition.

The foregoing example shows how, by employing light magnesium carbonate according to the present invention, the total amount of silicate of soda of 48.5° Baumé may be reduced below the amount hitherto used in the prior art, thus reducing the cost of the finished product. The use of light magnesium carbonate also permits the cost to be reduced in another manner by using a cheaper silicate of soda having a specific gravity less than the 48.5° Baumé silicate of soda heretofore customarily used, while yet producing a satisfactory water and moisture resistant product (such as wallboard) with a relatively inexpensive filler other than finely ground limestone.

In respect to the manner whereby the light magnesium carbonate produces a commercially water and moisture resistant building composition when incorporated with silicate of soda solution and an inorganic filler, I am not able to say definitely at this time. It is possible, due to the extreme fineness of the particles of the light magnesium carbonate that a chemical or quasi-chemical reaction takes place, wholly or in part between the light magnesium carbonate and the silicate of soda to form a more or less water insoluble magnesium silicate.

On the other hand, the waterproofing reaction between the light magnesium carbonate and the silicate of soda solution may be a physical one. The enormous surface area of the very minute particles of the light magnesium carbonate may absorb the silicate of soda strongly so that a cementing effect is obtained.

There may be other explanations of this waterproofing reaction in building materials between light magnesium carbonate and silicate of soda solution incorporated therein, but I am not now able to decide what is the correct explanation.

While the above example shows in a general way the nature of my invention, I do not in any way restrict myself to these given ingredients or proportions. For example, I may use more of the light magnesium carbonate and a less concentrated silicate of soda solution, and at the same time I may crush the sand somewhat finer. For instance, there may be taken 800 parts by weight of sand passing a 36 mesh screen, 12½ parts by weight of light magnesium carbonate, and 317 parts by weight of silicate of soda solution having a gravity of 42.5° Baumé. This mixture may then be molded and intumesced by heat in the manner set forth above in connection with the preceding example. Or, again, I may prefer to use a mixture of coarse sand and fine sand with varying amounts of light magnesium carbonate and varying amounts of silicate of soda solutions of different concentrations and of different ratios of sodium and silicon. Again, I may prefer to use a mixture of different particulate inorganic fillers, e. g., a mixture of sand and ground limestone, with light magnesium carbonate, and silicate of soda solutions, etc., etc.

It will be seen from the examples above given that the light magnesium carbonate constitutes only a minor part of the intumescent mixture, and usually amounts to only a few per cent. of the quantity of filler employed.

I claim as my invention:

1. A composition of matter comprising a thoroughly intumesced combination of silicate of soda, an inorganic filler and a minor quantity of light magnesium carbonate.

2. An intumesced, porous composition of matter containing a filler having a relatively small proportion of light magnesium carbonate mixed therewith and silicate of soda solution.

3. An intumesced, porous composition of matter containing sand, light magnesium carbonate and silicate of soda.

4. An intumesced, porous composition of matter containing substantially dry sand, partly as occurring in nature, and partly artificially crushed, light magnesium carbonate and silicate of soda solution.

5. An intumesced, porous, composition of matter containing a particulate inorganic filler, light magnesium carbonate and silicate of soda solution.

6. A method of making an intumesced porous building material which comprises making a mixture of particulate, inorganic fillers, light magnesium carbonate and silicate of soda solution of less density than 48.5° Bé., and heating such mixture to cause it to intumesce.

7. The method of making an intumesced porous building material which comprises mixing a ground inorganic filler with sodium silicate and light magnesium carbonate and heating the resulting mixture to cause it to intumesce.

8. The method of making an intumesced porous building material which comprises mixing ground limestone with light magnesium carbonate and sodium silicate and heating the resulting mixture to cause it to intumesce.

HUGH M. SPENCER.